United States Patent Office 3,169,996
Patented Feb. 16, 1965

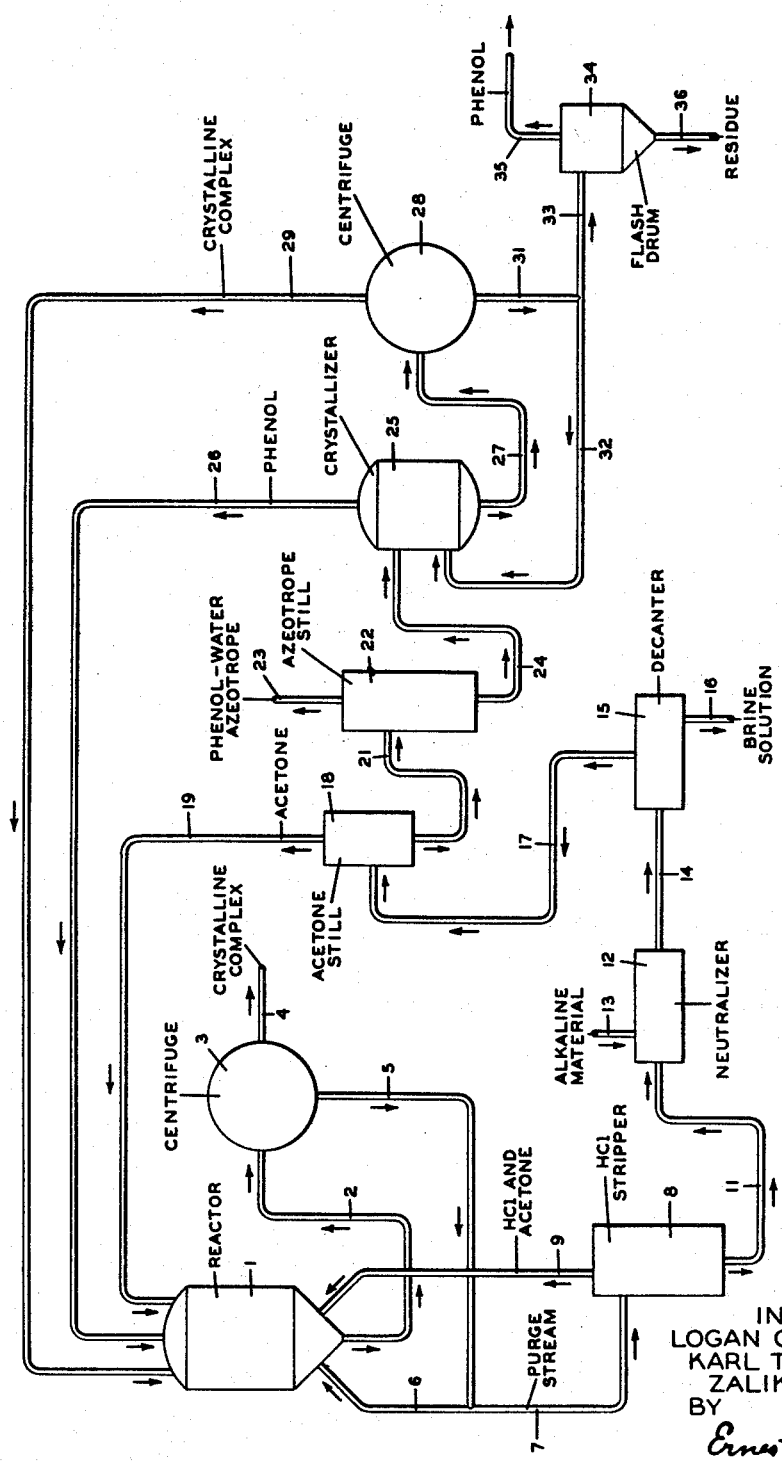

3,169,996
RECOVERY OF p,p'-ISOPROPYLIDENE-DIPHENOL
Logan C. Bostian, Morris Township, Morris County, Karl T. Nilsson, Montville Township, Morris County, and Zalik Oser, Morris Township, Morris County, N.J., assignors to Allied Chemical Corporation, New York, N.Y., a corporation of New York
Filed Mar. 14, 1961, Ser. No. 95,635
4 Claims. (Cl. 260—619)

This invention relates to the recovery of p,p'-isopropylidenediphenol from mixtures thereof with by-products of the hydrogen chloride-catalyzed reaction of phenol and acetone. More particularly, the invention relates to the recovery of p,p'-isopropylidenediphenol from a purge stream containing by-products of the hydrogen chloride-catalyzed reaction of phenol and acetone.

p,p'-Isopropylidenediphenol has become increasingly important in many areas of application. It is particularly valuable as an intermediate in the manufacture of products such as polycarbonates and epoxy type resins. Polycarbonate resins find utility in lenses, instrument windows, oil sight gauges and transparent appliance parts.

p,p'-Isopropylidenediphenol is generally produced by a continuous or semi-continuous process which involves the reaction of phenol and acetone in liquid phase at temperature of about 20° to 80° C. in the presence of hydrogen chloride as catalyst. Conversion of the phenol and acetone is carried to the point at which a slurry of p,p'-isopropylidenediphenol crystals in liquid medium is formed. The crystals consisting of a complex of p,p'-isopropylidenediphenol and phenol are recovered from the liquid medium by centrifuging and are then heated in vacuum to distill phenol from the desired p,p'-isopropylidenediphenol crystalline product.

The by-products of the hydrogen chloride-catalyzed reaction of phenol and acetone are impurities comprising for the most part o,p'-isopropylidenediphenol and codimer compound (4-(p-hydroxyphenyl)-2,2,4-trimethylchroman). Small amounts of color bodies and other products are also present. These impurities remain in the liquor recovered during centrifuging; hence, part of the liquor is continuously or semi-continuously purged in order to keep the amount of impurities in the system at a low level. The liquor also contains hydrogen chloride catalyst and unreacted acetone and phenol.

In the recovery of p,p'-isopropylidenediphenol from by-products of the reaction of phenol and acetone by conventional fractional distillation, appreciable deterioration of the p,p'-isopropylidenediphenol occurs, resulting in low yields of inferior product. Hence, there is a need in the art for new and effective separation procedures.

An object of the present invention is to provide a simple and efficient process for recovering p,p'-isopropylidenediphenol in high yield and purity from mixtures thereof with by-products of the hydrogen chloride-catalyzed reaction of phenol and acetone.

Another object of the invention is to provide a simple and efficient process for recovering p,p'-isopropylidenediphenol in high yield and purity from a purge stream containing by-products of the hydrogen chloride-catalyzed reaction of phenol and acetone.

Other objects and advantages of the invention will be apparent from the following description.

According to the present invention, p,p'-isopropylidenediphenol is recovered from mixtures thereof with by-products of the hydrogen chloride-catalyzed reaction of phenol and acetone, said mixtures also containing unreacted phenol, unreacted acetone, hydrogen chloride and water, by a process which comprises distilling the mixture under conditions to remove part of the hydrogen chloride and part of the acetone without removing hydrogen chloride in the form of an azeotrope with water and phenol, neutralizing the remaining hydrogen chloride present in the residue from the distillation, distilling the neutralized material under conditions to remove the remaining acetone and then water in the form of an azeotrope with phenol, crystallizing the residue from the last-named distillation to obtain a slurry of crystals comprising a complex of p,p'-isopropylidenediphenol and phenol in liquid phenol and separating said crystals from the slurry.

A typical purge stream in the hydrogen chloride-catalyzed reaction of phenol and acetone contains (by weight) about 20 to 30%, p,p'-isopropylidenediphenol, about 45 to 55% phenol, about 1 to 8% acetone, about 1 to 8% HCl, about 5 to 15% $H_2O$ and about 1 to 6% by-products. When this purge stream is heated in a distillation column, hydrogen chloride and acetone are distilled over first.

We have found that in order to recover maximum hydrogen chloride from the purge stream without additional by-product and color formation, the initial distillation must be carried out under such conditions that the ternary azeotrope of hydrogen chloride, water and phenol (15.8% hydrogen chloride, 64.8% water and 19.4% phenol) does not distill over. Not only do the conditions at which such azeotrope distills over result in by-product and color formation, but the azeotrope contains such a high content of water that it could not be returned to the phenol-acetone reaction zone. The amount of hydrogen chloride which may be removed during the initial distillation depends upon the ratio of water to hydrogen chloride present in the purge stream. As the ratio of water to hydrogen chloride decreases, it is possible to remove a greater proportionate amount of hydrogen chloride without distilling over the undesired ternary azeotrope.

We prefer to distill the purge stream at temperature of about 80° to 120° C. at substantially atmospheric pressure to remove about 40 to 60% by weight of the hydrogen chloride and about 8 to 12% by weight of the acetone without distilling over the ternary azeotrope of hydrogen chloride, water and phenol. Correspondingly reduced or increased temperatures and pressures, however, may be used. During the distillation, about 35 to 45% by weight of the acetone reacts with phenol present in the stream to form additional p,p'-isopropylidenediphenol and by-products. The hydrogen chloride and acetone are removed as vapors and may be returned to the reaction bone of the phenol and acetone without condensation.

The residue from the distillation is neutralized to a pH of about 4.0 to 4.5 with a suitable water-soluble inorganic alkaline material, e.g. caustic soda, calcium carbonate, sodium carbonate, etc., at temperature of about 80° to 90° C. If the pH attained is above about 4.5, phenol and p,p'-isopropylidenediphenol are undesirably neutralized. If the pH is below about 4.0, HCl is not completely neutralized. An aqueous layer containing the alkaline material forms and is decanted from the neutralized product.

The neutralized material is generally distilled at temperature of about 80° to 130° C. at substantially atmospheric pressure to remove the residual acetone and then at about 80° to 130° C. and at pressure of about 100 to 400 mm. Hg to remove water in the form of an azeotrope with phenol.

A temperature of at least 80° C. is necessary to prevent crystal formation during removal of the acetone and phenol-water azeotrope. If temperature above about 160° C. is used, decomposition of the p,p'-isopropylidenediphenol occurs.

The residue from the acetone and phenol-water azeotrope distillation is then crystallized at temperature of about 60° C. up to the point at which the complex melts (about 98° C.), preferably not above 90° C., from which phenol may be semi-continuously or continuously evaporated at about 1 to 25 mm. Hg pressure. Instead of using such isothermal evaporation procedure, crystallization can be effected by conventional cooling. A slurry of crystals comprising p.p'-isopropylidenediphenol-phenol complex in liquid phenol is formed. The crystals are then recovered by any suitable procedure, as by centrifuging. These crystals are high purity crystals which may be recycled to the phenol-acetone reaction zone.

The recovered mother liquor containing relatively all of the by-products originally present in the purge stream is divided, part being recycled to the crystallization zone and the rest stripped of phenol and discarded.

The ratio of p,p'-isopropylidenediphenol, o,p'-isomer and codimer compound initially present in the purge stream are typically in the ratio of about 90 to 7 to 3, respectively. With use of the process of this invention, the p,p'-isopropylidenediphenol that is recycled to the phenol-acetone reaction zone contains p,p'-isopropylidenediphenol, o,p'-isomer and codimer compound typically in ratio of about 98 to 1.5 to 0.5, respectively. These crystals have an A.P.H.A. value not in excess of about 6000. The discarded mother liquor, containing p,p'-isopropylidenediphenol, o,p'-isomer and codimer compound typically in ratio of about 30 to 50 to 20, respectively, has an A.P.H.A. value of at least about 10,000. The yield of p,p'-isopropylidenediphenol recovered is generally in the order of about 80 to 90% of that present in the purge stream.

The A.P.H.A. test referred to involves measuring the intensity of light transmitted through an acetone solution of the sample to be measured. This test may be carried out using a Lumetron colorimeter Model 402–E, provided with a B–420 filter and a 150 mm. sample holder. The colorimeter is standardized against reagent grade acetone. 100 grams of the sample is dissolved in reagent grade acetone to make up 200 ml. total solution. The sample is placed in the sample holder, and the scale reading at the balance point is taken. The A.P.H.A. value of the sample is read directly from a calibration curve which is drawn from values obtained using known solutions of a platinum-cobalt color standard. Details of making up suitable A.P.H.A. testing solutions can be found at pages 14 and 15 of Standard Methods for Examination of Water and Sewage, 9th Ed., 4th Printing (1951), American Public Health Association. The sample is said to have a certain number of A.P.H.A. "units," i.e., light transmission characteristics equivalent to the corresponding numbered A.P.H.A. test solution. Lower numbers correspond to increasingly purer samples.

The accompanying drawing is a diagrammatic flow sheet illustrating practice of the invention in continuous manner. Referring to the drawing, phenol and acetone are reacted in conventional manner at temperature of about 20° to 80° C. in the presence of hydrogen chloride catalyst in reactor 1. After reaction is complete, the contents comprising a slurry of p,p'-isopropylidenediphenol complex crystals is passed via line 2 to centrifuge 3. In centrifuge 3, product crystals are separated and withdrawn through line 4. The mother liquor from the centrifuge is withdrawn through line 5 and separated into two parts. One part of the liquor is returned to reactor 1 via line 6, and the other part constituting a purge stream is introduced via line 7 into HCl stripper 8. The purge stream contains unreacted acetone and phenol, hydrogen chloride catalyst, water and various by-product impurities including o-p'-isomer and codimer compound, in addition to dissolved p,p'-isopropylidenediphenol. In stripper 8, the stream is distilled at temperature of about 80° to 120° C., preferably about 100° to 110° C., at substantially atmospheric pressure. The distillation is ordinarily carried out for a period of about ¼ to 1½ hours, typically about ½ to 1 hour. Under these conditions, about 40 to 60%, and usually about 45 to 55%, by weight of the hydrogen chloride and about 8 to 12% by weight of the acetone are removed as vapors without distilling over the ternary azeotrope of hydrogen chloride, water and phenol. These vapors are sent via line 9 to reactor 1.

The bottoms from stripper 8 are then passed through line 11 to neutralizer 12. A suitable alkaline material, e.g. caustic soda solution, is introduced to the neutralizer via line 13 in sufficient amount to attain a pH of about 4.0 to 4.5, thereby neutralizing the remaining hydrogen chloride.

The neutralized material is then transmitted through line 14 to decanter 15 where brine solution is separated from the organic material and withdrawn from the system through line 16. Trace amounts of organic materials present in the brine solution may be stripped out, if desired, and the solution then discarded.

The organic material from decanter 15 is sent via line 17 to acetone still 18 where it is distilled at temperature of about 80° to 130° C. at substantially atmospheric pressure to remove the remaining acetone as overhead via line 19. This acetone may then be recycled to reactor 1.

The bottoms from still 18 are then passed via line 21 to azeotrope still 22 where an azeotrope of phenol and water is distilled at temperature of about 80° to 130° C. and at pressure of about 100 to 400 mm. Hg. The azeotrope is removed through line 23 and is generally sent to water waste. If desired, the azeotrope may be treated by known methods for recovery of phenol.

If the operation is carried out in semi-continuous manner, a single still may be used for removing the remaining acetone and the phenol-water azeotrope.

The bottoms from still 22 are passed through line 24 to crystallizer 25. In crystallizer 25, phenol is evaporated from the material at temperature of about 60° to 90° C. and at pressure of about 1 to 25 mm. Hg whereby a slurry of crystalline complex of p,p'-isopropylidenediphenol and phenol in liquid phenol is formed. The phenol vapors are sent via line 26 to reactor 1.

The slurry of crystalline complex of p,p'-isoproylidenediphenol and phenol is then passed from crystallizer 25 through line 27 to centrifuge 28 where the crystals are separated and then returned to reactor 1 via line 29. This crystalline complex has been found to be a relatively pure material having an A.P.H.A. value of not above about 6000 units. Moreover, its p,p'-isopropylidenediphenol component is recovered in yield of at least about 80% based on the amount of p,p'-isopropylidenediphenol in the original purge stream.

The mother liquor from centrifuge 28, containing relatively all of the by-products originally present in the purge stream, is withdrawn through line 31 and divided into two parts. One part of the mother liquor is returned via line 32 to crystallizer 25, and the remaining part is sent through line 33 to flash drum 34. In the flash drum, the remaining phenol present in the liquor is distilled off through line 35 at temperature of about 60° to 200° C. and at pressure of about 1 to 25 mm. Hg and may be recycled to reactor 1. If desired, part of this phenol may be recirculated to flash drum 34.

The bottoms from drum 34 containing a small amount of phenol and p,p'-isopropylidenediphenol are withdrawn through line 36 as residue.

The efficiency with which p,p'-isopropylidenediphenol is recoverd from a typical purge stream in accordance with the present invention is evidenced by the following example. In the example, parts are by weight.

EXAMPLE

Referring to the attached drawing, a purge stream from the hydrogen chloride catalyzed-reaction of phenol and acetone contains 1280 parts of phenol, 720 parts of p,p'-isopropylidenediphenol, 276 parts of water, 160 parts of HCl, 160 parts of acetone and 120 parts of by-products. This stream is introduced into HCl stripper 8 where it is distilled at temperature of about 100° to 110° C. at atmospheric pressure for a period of about ½ hour. 80 parts of HCl, 12 parts of acetone, 44 parts of water and 5 parts of phenol are distilled overhead as vapors and returned to reactor 1. None of the hydrogen chloride distills over in the form of an azeotrope with the water and phenol. About 65 parts of the acetone react with phenol present in the stream to form additional p,p'-isopropylidenediphenol and by-products.

The bottoms of stripper 8 are then sent to neutralizer 12 where the remainder of the HCl is neutralized with a 20% caustic solution to a pH of about 4.0. The neutralized material is sent to decanter 15 where brine solution separates from the organic material and is withdrawn from the system.

The organic material is next sent to acetone still 18 where it is distilled at temperature of about 130° C. at atmospheric pressure to remove the remaining 83 parts of acetone. The acetone comes over at temperature of about 55° C.

The bottoms from still 18 are passed to azeotrope still 22 where an azeotrope of phenol and water comprising 20 parts of phenol and 179 parts of water is distilled at temperature of about 120° C. and at pressure of about 100 mm. Hg. The azeotrope comes over at temperature of about 50° C. The bottoms from azeotrope still 22 are passed to crystallizer 25 where 426 parts of phenol are evaporated from the material at temperature of about 60° C. and at pressure of about 1 mm. Hg. p,p'-isopropylidenediphenol-phenol complex crystals are precipitated in the crystallizer in the form of a slurry in liquid phenol.

The slurry of p,p'-isopropylidenediphenol-phenol complex crystals is then passed to centrifuge 28 where the crystals are separated and returned to reactor 1. The recycled crystals, constituting 942 parts, have an A.P.H.A. value of about 3000 units. The amount of p,p'-isopropylidenediphenol recovered from the purge stream based on the amount initially present in the purge stream represents a yield of about 81%.

The mother liquor from centrifuge 28 having an A.P.H.A. value of about 10,500 units and containing a minimal amount of p,p'-isopropylidenediphenol is passed to flash drum 34 where the remaining phenol, comprising 530 parts, is distilled from the liquor and recycled to reactor 1.

Although certain preferred embodiments of the invention have been disclosed for purposes of illustration, it will be evident that various changes and modifications may be made therein without departing from the scope and spirit of the invention.

We claim:

1. A process for recovering p,p'-isopropylidenediphenol from liquid mixtures thereof with by-products of the hydrogen chloride-catalyzed reaction of phenol and acetone, said mixtures also containing unreacted phenol, unreacted acetone, hydrogen chloride and water, which comprises distilling the mixture at temperature of about 80° to 120° C. at substantially atmospheric pressure to remove part of the hydrogen chloride and part of the acetone without removing hydrogen chloride in the form of an azeotrope with water and phenol, adjusting the residue from the distillation to pH of about 4.0 to about 4.5 to neutralize the remaining hydrogen chloride, distilling the neutralized material at temperature of about 80° to 160° C. at substantially atmospheric pressure to remove the remaining acetone and then at about 80° to 160° C. and at pressure of about 100 to 400 mm. Hg to remove water in the form of an azeotrope with phenol, crystallizing the residue from the last-named distillation to obtain a slurry of crystals comprising a complex of p,p'-isopropylidenediphenol, phenol in liquid phenol and separating said crystals from the slurry and recovering p,p'-isopropylidenediphenol from the separated crystals.

2. A process for recovering p,p'-isopropylidenediphenol from a liquid purge stream containing by-products of the hydrogen chloride-catalyzed reaction of phenol and acetone, unreacted phenol, unreacted acetone, hydrogen chloride and water, as well as p,p'-isopropylidenediphenol, which comprises distilling the stream at temperature of about 80° to 120° C. at substantially atmospheric pressure to remove part of the hydrogen chloride and part of the acetone without removing hydrogen chloride in the form of an azeotrope with water and phenol, adjusting the residue from the distillation to pH of about 4.0 to about 4.5 to neutralize the remaining hydrogen chloride, distilling the neutralized material at temperature of about 80° to 160° C. at substantially atmospheric pressure to remove the remaining acetone and then at about 80° to 160° C. and at pressure of about 100 to 400 mm. Hg to remove water on the form of an azeotrope with phenol, crystallizing the residue from the last-named distillation to obtain a slurry of crystals comprising a complex of p,p'-isopropylidenediphenol and phenol in liquid phenol, separating said crystals from the slurry and recycling the separated crystals to the reaction zone for the hydrogen chloride-catalyzed reaction of phenol and acetone.

3. A process for recovering p,p'-isopropylidenediphenol from a liquid purge stream containing by-products of the hydrogen chloride-catalyzed reaction of phenol and acetone, unreacted phenol, unreacted acetone, hydrogen chloride and water, as well as p,p'-isopropylidenediphenol, which comprises distilling the mixture at temperature of about 80° to 120° C. at substantially atmospheric pressure to remove about 40 to 60% by weight of the hydrogen chloride and part of the acetone without removing hydrogen chloride in the form of an azeotrope with water and phenol, adjusting the residue from the distillation to pH of about 4.0 to about 4.5 to neutralize the remaining hydrogen chloride, distilling the neutralized material at temperature of about 80° to 160° C. at substantially atmospheric pressure to remove the remaining acetone and then at about 80° to 160° C. and at pressure of about 100 to 400 mm. Hg to remove water in the form of an azeotrope with phenol, crystallizing the residue from the last-named distillation to obtain a slurry of crystals comprising a complex of p,p'-isopropylidenediphenol and in liquid phenol, separating said crystals from the slurry and recycling the separated crystals to the reaction zone for the hydrogen chloride-catalyzed reaction of phenol and acetone.

4. A process for separating p,p'-isopropylidenediphenol from a liquid purge stream containing by-products of the hydrogen chloride-catalyzed reaction of phenol and acetone, unreacted phenol, unreacted acetone, hydrogen chloride and water, in addition to p,p'-isopropylidenediphenol, which comprises distilling the stream at temperature of about 100° to 110° C. at substantially atmospheric pressure to remove about 45 to 55% by weight of the hydrogen chloride and part of the acetone, adjusting the residue from the distillation to pH of about 4.0 to 4.5 to neutralize the remaining hydrogen chloride, distilling the neutralized material at temperature of about 80° to 130° C. at substantially atmospheric pressure to remove the remaining acetone and then at about 80° to 130° C. and at pressure of about 100 to 400 mm. Hg to remove water in the form of an azeotrope with phenol, crystallizing the residue from the last-named distillation to obtain a slurry of crystals comprising a complex of p,p'-isopropylidenediphenol and phenol in liquid phenol, separating said crystals from the slurry and recycling the separated crystals to the reaction zone for the hydrogen chloride-catalyzed reaction of phenol and acetone.

References Cited in the file of this patent

UNITED STATES PATENTS

| | | |
|---|---|---|
| 2,182,308 | Britton et al. | Dec. 5, 1939 |
| 2,737,480 | Adams et al. | Mar. 6, 1956 |
| 2,824,048 | Hupe et al. | Feb. 18, 1958 |

OTHER REFERENCES

"Azeotropic Data," pages 9, 250 (2 pages), published by American Chemical Society, Washington, D.C. (1952).

UNITED STATES PATENT OFFICE
CERTIFICATE OF CORRECTION

Patent No. 3,169,996                                         February 16, 1965

Logan C. Bostian et al.

It is hereby certified that error appears in the above numbered patent requiring correction and that the said Letters Patent should read as corrected below.

Column 2, line 56, for "bone" read -- zone --; column 6, line 14, strike out the comma, second occurrence, and insert instead -- and --; same line 14, strike out "and", and insert instead a comma; same column 6, line 60, after "and" insert -- phenol --.

Signed and sealed this 27th day of July 1965.

(SEAL)
Attest:

ERNEST W. SWIDER                                          EDWARD J. BRENNER
Attesting Officer                                                Commissioner of Patents